2,752,350

TREATMENT OF EXTRACTION LIQUORS FROM POPPY STRAW

Hanns G. Maister, Peoria, Ill., assignor to the United States of America as represented by the Secretary of Agriculture No Drawing. Application July 13, 1954,
Serial No. 443,177

5 Claims. (Cl. 260—285)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the recovery of morphine and associated alkaloids from liquors obtained by the extraction of poppy capsules or poppy straw with an alcohol solvent. It relates further to methods for recovering a crude concentrate high in alkaloid content from such extraction liquors which process involves an intermediate step of separating waxy impurities from the extract before final concentration or drying. It relates in particular to a method for removing isobutyl alcohol solvent from such extracts by a distillation process which eliminates the tendency of wax-like impurities to precipitate in the distillation apparatus. It relates, moreover, to methods of recovery of morphine from these separated wax-like impurities.

Morphine and associated alkaloids have been extracted from poppy straw, or preferably, poppy capsules containing said alkaloids by solvents containing aliphatic alcohols as a major extractant.

According to the invention described and claimed in Serial No. 290,109 filed May 26, 1952, now Patent No. 2,715,627, by Charles L. Mehltretter and Francis B. Weakley, the extraction is carried out employing an alkanol such as isobutyl alcohol, containing minor proportions of water and preferably containing an alkali such as ammonia. The extract of said process may be treated with acid, and the alkaloids recovered in salt form in the acid extract. Furthermore, alkaloids may be recovered from the alcohol extract of poppy capsules with treatment of ion exchange substances such as sulfonated coal. This latter methods of recovery is described and claimed in application Serial No. 290,110, filed May 26, 1952 by Charles L. Mehltretter and Francis B. Weakley.

The methods of extraction of poppy capsules which yield alcoholic extracts containing the alkaloids carried out according to the Mehltretter and Weakley inventions, or according to all other extraction methods involving the use of aqueous alcohols known to us, contain as impurities wax-like substances which interfere with the recovery of the alkaloids from the extracts. If recovery is carried out by evaporation of the solvents, these wax-like impurities deposit in the distillation apparatus and impair the efficiency of the operation. If the recovery is by ion exchange methods, the waxes tend to deposit in the ion exchange columns and interfere seriously with the adsorption, elution and regeneration steps.

According to one feature of the present invention the alcoholic extracts are distilled by a process which removes the solvent as a binary azeotrope with water. Simultaneously with the azeotropic distillation, critical amounts of water are added to the extract liquor during the distillation so as to maintain in the distillation residues a water concentration great enough to prevent substantial precipitation of the wax-like substances. These conditions of distillation of the azeotrope and addition of water are continued until substantially all the alcohol is removed from the extract, and the residual liquor consists of an aqueous solution of the non-volatile substances present in the original extract.

In further accordance with the present invention this residual aqueous solution may be treated, as by cooling, to effect precipitation of the wax-like substances which are present in the residue in emulsified form, and further treated so as to separate the wax-like substances, leaving an aqueous solution which may be further treated to recover a crude wax-like alkaloid concentrate, as by evaporation or by ion exchange.

This invention relates in one of its particular embodiments to the separation of solvent from an extract obtained in accordance with the earlier mentioned Mehltretter and Weakley extraction process. In one embodiment of that process a water saturated solution of isobutyl alcohol, preferably containing sufficient ammonia to convert the alkaloids to the corresponding ammonium salts is used to extract the alkaloid containing poppy material. The extract so obtained contains approximately 90 percent by weight of isobutyl alcohol. If this extract were distilled under conventional conditions, the azeotrope containing approximately 67 percent isobutyl alcohol and 32 percent water would soon exhaust the distilland of water, leaving a residual solution of the alkaloids and other extracted material in isobutyl alcohol. As the distillation is carried out from this point on, the waxy substances tend to deposit on the internal surfaces of the still.

According to this invention, with regard to the particular embodiment previously mentioned, the difficulties associated with the deposit of waxy materials is avoided completely by adding sufficient water back to the distilland to maintain the azeotrope. This may be accomplished by leading in water from an independent source, or the water may be obtained from the feed-in from the condensate of the azeotropic vapors. The latter may be accomplished simply by leading back the lower water layer which forms in the condensate. The aqueous residue or distilland comprising the dissolved alkaloids and the suspended wax, after separation of isobutyl alcohol is complete, is then cooled whereupon the wax particles congeal and may readily be separated as by screening or settling and decantation of the liquor.

Morphine may then be recovered by further treatment of the de-waxed residue. For example, it may be further evaporated to dryness or to a sirup to yield a crude residue having a morphine content higher than that of conventional opium. Alternatively, the de-waxed residue may be treated by ion exchange resins to eliminate impurities and separate the morphine by adsorption.

The distillation is preferably carried out, adjusting the feed to below pH 7 e. g., pH 6.0 to 7.0, and it is advisable to preheat the feed to prevent congealing of the wax. During the distillation the acidity of the distilland usually decreases, so that upon cooling, the wax separates readily and the distilland usually can be screened or decanted cleanly.

I have also discovered that substantially all the morphine in the wax product can be recovered by introducing a wax extraction step into the process. This step, integrated in to the distillation and processing of the original extract liquors affords total morphine recoveries in excess of 95 percent of that in the extract.

This morphine recovery comprises, as an integral feature, the dissolution or dispersion of the wax in an aqueous alkaline extracting solution, followed by reprecipitation of the wax by the addition of acid. The extract of the wax, after separation from the precipitated wax, may then be distilled independently, or preferably, may be passed to a continuous evaporator to join the residual liquor from the distillation unit.

The alkaline solution and extraction of the wax may be carried out at pH 8 to 10 and is preferably carried out at a temperature above 75° C. The wax precipitation may be carried out at pH below 7.0, for example between 6.5 and 3.5. One single extraction removes most of the morphine content of the wax, but it is to be understood that my invention includes the recovery of still further quantities from the precipitated wax by one or more aqueous alkaline extractions followed by reprecipitation. For example, I have found that a single extraction removes about 60 percent of the morphine associated with the wax. The second extraction removes an additional 30 percent, and still a third extraction recovers even more.

As will be understood by those skilled in the art, my novel method of morphine recovery may be carried out as a step independent of the main solvent distillation of the original poppy straw extract. In such a method the wax, separated from the aqueous residue as by cooling and screening, may be extracted and the extract distilled or treated by ion exchange in an independent operation. This latter procedure may be preferable in some instances, since the morphine containing wax may be accumulated and stored or transported in containers, to a separate installation devoted principally to the recovery of the associated morphine and refining of the wax. Example 1, below, illustrates my process in which the wax is merely separated from the aqueous residue, and the latter alone further treated for morphine recovery.

I prefer, however, to carry out the combined recovery of morphine from residue and wax inasmuch as this method reduces the amount of expensive equipment required, and the de-waxed extract is especially suitable for combining with the main distillation residue for further concentration by evaporation.

The following specific examples illustrate the invention.

EXAMPLE I

An isobutanol extract of poppy straw obtained by extracting dry matured poppy stems and capsules with ammoniacal, water-saturated isobutanol has a pH of 8.4, an isobutanol content of 91.5 percent, and a morphine content of 184.0 mg. per 100 ml. Sulfuric acid was added to 145.5 gallons of this extract to render the pH 6.5, and the liquor was pumped to the fifth plate of a 20 plate bubble tray pilot plant distillation unit at the rate of 17.1 gallons per hour. Before entering the column, the liquor was passed through a condenser operated in conjunction with the still, where it was preheated to 65° C. The azeotrope vapor from the still was condensed and the condensate collected in a decanter, where it separated into two layers. The upper layer, consisting of water-saturated isobutanol was withdrawn continuously to storage. The lower layer, consisting of water containing about 10 percent isobutanol, was pumped continuously back to the fifth plate of the distillation column where it joined the incoming feed. The unit was provided with a combination of direct and indirect steam, the former variable and the latter constant. The latter was fed to a calandria in the bottom of the still. The residue liquor was permitted to accumulate in the still bottom to a point above the calandria and excess was then withdrawn, passing in a thin film over a cooling place. Wax separated in solid flakes in the film, and were separated by screens covered with cheesecloth. After completion of the distillation, the bottom chamber of the still was drained, and the drained liquor was allowed to stand for several hours whereupon wax separated and settled to the bottom of the container. The liquor and wax were separated by decantation.

The residual liquors were combined, and the combination contained 770 mg. morphine per 100 ml. It was concentrated under 28-inch vacuum to a heavy sirup. The evaporation proceeded with no foaming and no precipitation. After cooling down to room temperature and standing overnight, the heavy sirup became semisolid. Microscopic examination revealed the presence of a large amount of crystals. It contained 27.0 percent morphine on a dry basis. Analysis of the wax previously separated showed its morphine content to be 1.99 percent, or roughly, 10 percent of the total morphine fed to the unit.

EXAMPLE II

Extraction liquor, similar in character to that used in Example I was acidified to pH 6.1 and pumped to the unit employed in Example I, and the distillation procedure was similar to that of Example I. The extract liquor feed and the isobutanol from the condensate decanter were fed continuously at the fifth plate of the column. However, the residual liquor withdrawn from the bottom of the column was led into a receiver provided with a jacket for cooling. During accumulation of the residual liquor in the receiver, cooling water was circulated through the jacket to accelerate wax separation.

At the end of the distillation of 936 pounds of extract liquor the residual liquor in the bottom chamber of the column was withdrawn and also led into the cooled receiver. To facilitate an accurate material balance for the distillation step, the column was washed with 40 pounds of 1 percent caustic soda solution. This wash solution was then adjusted to pH 6.5 with sulfuric acid and also led into the cooled receiver.

The liquor in the receiver was permitted to stand for several hours, during which time the wax portion settled out in a solid layer. The supernatant liquor was siphoned off, and the wax treated in the following manner to recover the associated morphine alkaloids.

Five gallons of tap water was added to the wax, and the pH adjusted to 9.5 with 30 percent caustic soda solution. The mixture was heated to 85° C. and vigorously agitated for 15 minutes during which time the wax was dissolved or dispersed completely. Diluted sulfuric acid was added slowly to pH 4.7. Wax again settled out in a solid layer after several hours standing at room temperature. The supernatant wash liquid was removed, and the wax extraction procedure repeated two more times, except that the pH of wax precipitation for the second and third washings was 6.8.

The wash liquors and de-waxed residual liquor from the distillation were evaporated to a sirup following the procedure of Example I.

The morphine balance for the distillation step is shown in Table I.

*Table I*

MORPHINE BALANCE

| In | Morphine, gms. |
|---|---|
| Extract liquor, 936 lbs | 841.9 |
| Out | |
| Residual liquors, 367 lbs | 747.2 |
| First wash water of wax, 37.6 lbs | 59.9 |
| Second wash water of wax, 50.9 lbs | 15.0 |
| Third wash water of wax, 61.9 lbs | 8.4 |
| Total | 830.5 |
| Percent of morphine accounted for | 98.7 |

Analysis of the sirups from evaporation gave an overall recovery of morphine for the entire experiment to be 96.1 percent of that present in the original extract liquors.

EXAMPLE III

The morphine-containing extract used in this example had a pH of 7.4 and an isobutanol content of 91 percent. The liquor was acidified with dilute sulfuric acid to pH 6.8 and was fed continuously to the distillation column used in Examples I and II. The distillation was carried out as in Example II, the residual liquor being collected in a cooled receiver. It was allowed to remain in the receiver for several hours, and then the liquor was siphoned off leaving the precipitated wax. The wax was dispersed with a caustic soda solution at 85° and pH 8.6. To this dispersion was slowly added sufficient 30 percent sulfuric acid to reduce the pH to 4.0. The mixture, now containing a quantity of precipitated wax particles was cooled to room temperature and allowed to stand for several hours. At the end of this period the supernatant liquor was perfectly clear and had a pH of 3.6. It was siphoned off and the precipitated wax again dispersed in alkali as above. The two extracts obtained from the wax were combined with the liquor first decanted and the whole evaporated under 27 to 28 inches of vacuum at 32° C. The overall recovery of morphine, based on the morphine content of the original extract was 92 to 93 percent.

I claim:

1. Method for the separation of morphine alkaloids contained in an isobutanol solution containing minor amounts water and said alkaloids together with wax-like substances extracted from poppy straw, which comprises evaporating said solution in an evaporation zone and condensing the resulting vapors, adding sufficient water to said evaporation zone to produce a residual aqueous liquor substantially free of isobutanol containing said morphine alkaloids, and also containing dispersed therein said wax-like substances, separating said wax-like impurities from said residual liquor, and recovering alkaloid from said residual liquor.

2. In a method for recovering alkaloids from dry mature poppy straw comprising extracting said poppy straw with an alkaline organic solvent comprising an alkanol of from 3 to 5 carbon atoms to produce an alkaline alkanol extract containing extracted alkaloids, wax-like substances and minor quantities of water, the improvement which comprises adjusting the pH of said extract with acid to below 7.0, evaporating said extract to separate said alkanol, adding to said extract during evaporation an amount of water to maintain a condition of azeotropy in the alkanol-water vapors plus a substantial excess to also maintain a residual alkanol-free residual liquor containing said alkaloids and dispersed wax-like substances, and separating said wax-like substances from said residual liquor.

3. The method of claim 1 in which the separated wax-like substances are extracted with aqueous alkaline solvent at pH above 8.0 to extract alkaloids associated with said wax, and recovering said extracted alkaloids.

4. The method for the separation of morphine alkaloids contained in an isobutanol solution containing minor amounts of water and said alkaloids together with wax-like substances extracted from poppy straw which comprises adjusting the pH of said solution to pH 6.0–7.0, evaporating said solution in an evaporation zone whereby an azeotrope of isobutanol and water vapors is separated, said azeotrope containing a greater proportion of water than present in said solution, adding at least sufficient water to the evaporation zone to supply vapors for said azeotrope and produce an aqueous residual liquor substantially free of isobutanol and containing said morphine alkaloids in solution, and also containing dispersed therein said wax-like substances, cooling said liquor to congeal said wax-like substances, separating said liquor and said wax material, and recovering morphine alkaloids associated with said separated wax material by dispersion in aqueous alkali at pH 8 to 10, reprecipitating the wax material by acidification to pH 3.5–7, and separating the alkaloid containing aqueous liquor from the congealed wax material.

5. The method of claim 4 in which the separated reprecipitated wax material is treated by a second step of dispersion, extraction and precipitation substantially the same as the first step.

References Cited in the file of this patent

UNITED STATES PATENTS 2,132,945     Frey et al. _____ Oct. 11, 1938

OTHER REFERENCES

Barbier et al.: Bull. on Narcotics, (U. N.), vol. 2, No. 3, July 1950, pp. 22–29.